US008261333B2

(12) United States Patent
Awatsu et al.

(10) Patent No.: US 8,261,333 B2
(45) Date of Patent: Sep. 4, 2012

(54) BIOMETRICS AUTHENTICATION METHOD AND BIOMETRICS AUTHENTICATION SYSTEM

(75) Inventors: Kiyotaka Awatsu, Inagi (JP); Masanori Ohkoshi, Inagi (JP); Takahiro Kudoh, Inagi (JP); Kazuhiro Akutsu, Inagi (JP); Yoshiharu Ogawa, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 948 days.

(21) Appl. No.: 11/364,367

(22) Filed: Mar. 1, 2006

(65) Prior Publication Data
US 2007/0092112 A1    Apr. 26, 2007

(30) Foreign Application Priority Data

Sep. 20, 2005    (JP) .................................. 2005-271366

(51) Int. Cl.
*H04L 29/06* (2006.01)
(52) U.S. Cl. ........... 726/6; 726/5; 726/7; 726/9; 726/28; 726/29; 713/172; 713/185; 713/186
(58) Field of Classification Search ................. 340/5.52, 340/5.82, 5.53; 705/18; 713/186, 168, 169, 713/172, 182, 185, 189, 193; 382/115; 726/9, 726/2, 3, 4, 5, 6, 7, 16, 17, 18, 19, 20, 21, 726/26, 27, 29; 380/247, 277, 44; 902/4, 902/22, 26; 257/679, 922
See application file for complete search history.

(56) References Cited

U.S. PATENT DOCUMENTS

| | | | |
|---|---|---|---|
| 6,041,412 A * | 3/2000 | Timson et al. .................... 726/3 |
| 6,793,134 B2 * | 9/2004 | Clark ............................. 235/379 |
| 6,819,219 B1 * | 11/2004 | Bolle et al. .................... 340/5.52 |
| 6,976,171 B1 * | 12/2005 | Ritter et al. .................... 713/193 |
| 7,120,606 B1 * | 10/2006 | Ranzini et al. .................. 705/64 |
| 7,325,724 B2 * | 2/2008 | Bonalle et al. ................ 235/380 |
| 7,330,973 B2 | 2/2008 | Kotani |
| 7,562,813 B2 * | 7/2009 | Humphrey et al. ........... 235/379 |
| 2001/0026632 A1 * | 10/2001 | Tamai ............................ 382/116 |

(Continued)

FOREIGN PATENT DOCUMENTS
EP    1271436 A2 *    1/2003
(Continued)

OTHER PUBLICATIONS

Chinese Office Action dated Jul. 29, 2010, issued in corresponding Chinese Patent Application No. 200610066111.8.

(Continued)

*Primary Examiner* — Eleni Shiferaw
*Assistant Examiner* — Hilary Branske
(74) *Attorney, Agent, or Firm* — Westerman, Hattori, Daniels & Adrian, LLP

(57) ABSTRACT

A biometrics authentication system using biometrics media simplifies the process, and reduces the costs, of issuing a portable communication terminal having biometrics functions. A biometrics application program is downloaded from a server to a portable communication terminal, an area for authenticated biometrics information is caused to be created, and biometrics information on an individual card of the user is stored in a common area of the portable communication terminal. Thus, the portable communication terminal has the functions of an individual card storing biometrics information, and the portable communication terminal can be used as an individual card for biometrics authentication.

14 Claims, 12 Drawing Sheets

U.S. PATENT DOCUMENTS

| | | | |
|---|---|---|---|
| 2002/0174348 A1* | 11/2002 | Ting | 713/186 |
| 2003/0182569 A1* | 9/2003 | Matsuzaki et al. | 713/193 |
| 2004/0059925 A1* | 3/2004 | Benhammou et al. | 713/189 |
| 2004/0088562 A1* | 5/2004 | Vassilev et al. | 713/200 |
| 2004/0139316 A1* | 7/2004 | Kotani | 713/156 |
| 2005/0009564 A1* | 1/2005 | Hayaashi et al. | 455/558 |
| 2005/0086497 A1* | 4/2005 | Nakayama | 713/185 |
| 2005/0166264 A1* | 7/2005 | Yamada et al. | 726/21 |
| 2007/0057038 A1* | 3/2007 | Gannon | 235/380 |
| 2010/0031327 A1 | 2/2010 | Kotani | |

FOREIGN PATENT DOCUMENTS

| | | |
|---|---|---|
| JP | 64-7253 | 1/1989 |
| JP | 11-45364 | 2/1999 |
| JP | 2001-67523 | 3/2001 |
| JP | 2001067523 A | 3/2001 |
| JP | 2002-342809 | 11/2002 |
| JP | 2003216878 A | 7/2003 |
| JP | 2004-157790 A | 3/2004 |
| JP | 2005-174019 A | 6/2005 |
| JP | 2005-038257 A | 10/2005 |
| KR | 1020000067773 A | 11/2000 |
| KR | 1020010008371 A | 2/2001 |
| KR | 1020040087663 A | 10/2004 |

OTHER PUBLICATIONS

Office Action dated Feb. 15, 2011 in corresponding Japanese patent application No. 2005-271366 with partial English translation.

* cited by examiner

BIOMETRICS AUTHENTICATION METHOD AND BIOMETRICS AUTHENTICATION SYSTEM

CROSS-REFERENCE TO RELATED APPLICATIONS

This application is based upon and claims the benefit of priority from the prior Japanese Patent Application No. 2005-271366, filed on Sep. 20, 2005, the entire contents of which are incorporated herein by reference.

BACKGROUND OF THE INVENTION

1. Field of the Invention

This invention relates to a biometrics authentication method and biometrics authentication system which detect characteristics of a body and perform individual authentication, and in particular relates to a biometrics authentication method for biometrics authentication, with biometrics functions installed in a mobile communication device, and to a biometrics authentication system which uses a mobile communication device.

2. Description of the Related Art

Due to advances in information processing technology in recent years, various illicit transactions using electronic data have become prominent. In particular, as the use of cards together with passwords for individual authentication have become commonplace, the relation between card data and passwords has become widely known, and illicit acquisition of card data and passwords has become prominent, resulting in substantial harm.

Various biometrics technologies utilizing features of the human body have been proposed as methods to resolve problems with such methods using passwords. For example, methods utilizing the fingerprints, retinal images, facial features, blood vessel images (of the palm and fingers), and other features of the body have been proposed. In such biometrics technologies, biometrics data for the individual is registered in advance on an individual card. In order to perform a transaction employing biometrics, a biometrics information reader which acquires biometrics information, provided in the transaction apparatus, is used to acquire biometrics information for the individual. And the acquired biometrics information is compared with registered biometrics data on the individual card; the result of the comparison is used to enable a transaction (see for example Japanese Patent Laid-open No. 2001-067523).

With the spread of portable telephones and other portable terminals in recent years, various individual authentication services based on biometrics which utilize portable terminals have been studied. However, in the technology of the prior art a user must submit an application to have a portable terminal with biometrics functions issued; and various procedures, requiring time, must be performed by the issuer to confirm the identity of the user, register biometrics information for the user, and issue a portable terminal. Further, it is troublesome for both the user and for the issuer to issue a portable terminal having biometrics functions at a service area or similar.

That is, in order to realize an individual authentication service based on biometrics and utilizing portable terminals, time and effort are required of both the user and the issuer, and moreover the issuer bears the burden of issuing a portable terminal with biometrics functions in order not to impose a cost burden on the user; this cost aspect has also been an impediment to widespread use.

Thus although biometrics technology is an extremely effective means of preventing illicit transactions, the process of issuing portable terminals with security functions is complex and incurs costs, which have impeded widespread adoption.

SUMMARY OF THE INVENTION

Hence an object of this invention is to provide a biometrics authentication method and a biometrics authentication system utilizing mobile communication devices to simplify the process of issuing portable terminals which can be utilized in biometrics methods, and to promote the spread of individual authentication through biometrics.

A further object of the invention is to provide a biometrics authentication method and a biometrics authentication system utilizing mobile communication devices to reduce the cost of issuing portable terminals which can be utilized in biometrics authentication methods, and to realize individual authentication based on biometrics.

Still a further object of the invention is to provide a biometrics authentication method and a biometrics authentication system utilizing mobile communication devices to enable immediate issuing of portable terminals which can use biometrics authentication methods, while maintaining security.

In order to attain these objects, a biometrics authentication method of this invention has a step of accessing a server which manages a biometrics application program from a portable communication terminal having contact-free communication functions and mobile communication functions, via a mobile communication network; a step of downloading the biometrics application program from the server to the portable communication terminal; a step of reading the contents of an individual card which stores a biometrics information to be used by the user in biometrics authentication at a terminal; and, a step of communicating between the terminal and the portable communication terminal to which the biometrics application has program been downloaded, and of writing the biometrics information on the individual card to a storage area managed by the biometrics application program of the portable communication terminal.

Further, a biometrics authentication system of this invention has a server, which is accessed via a mobile communication network by a portable communication terminal having contact-free communication functions and mobile communication functions, and which transmits a biometrics application program to the portable communication terminal, and a registration terminal which reads the contents of an individual card in which is stored biometrics information for the user and which is used for biometrics by the user, communicates with the portable communication terminal to which the biometrics application program has been transmitted, and writes the biometrics information of the individual card to a storage area managed by the biometrics application program of the portable communication terminal.

Further, a biometrics authentication system of this invention has a portable communication terminal, having contact-free communication functions and mobile communication functions, which accesses a server managing a biometrics application program via a mobile communication network to downloads the biometrics application program from the server, and a biometrics information registration device, which reads an individual card of the user of the portable communication terminal, communicates with the portable communication terminal to which the biometrics application program has been downloaded, and writes the biometrics information on the individual card to a storage area managed by the biometrics application program of the portable communication terminal.

In this invention, it is preferable that the biometrics authentication method have a step of detecting the biometrics information for the user at the service terminal that executes a biometrics authentication, and a step of communicating with the service terminal using the contact-free communication functions of the portable communication terminal, and of verifying the biometrics information detected by the service terminal against the biometrics information written to the portable communication terminal.

In this invention, it is preferable that the writing step have a step in which the terminal communicates with the portable communication terminal to which the biometrics application program has been transmitted and judges whether use of the biometrics by the portable communication terminal is permitted, and a step, upon judging that the portable communication terminal is permitted to use biometrics, of writing the biometrics information on the individual card to a storage area managed by the biometrics application program of the portable communication terminal.

In this invention, it is preferable that the writing step have a step of detecting the biometrics information of the user, using a biometrics information detection unit; a step of verifying the biometrics information on the individual card against the biometrics information detected by the biometrics information detection unit; and a step, when the verification result is satisfactory, of using the contact-free communication functions of the portable communication terminal in communication, to write the biometrics information to the portable communication terminal.

In this invention, it is preferable that the biometrics authentication method have a step in which the portable communication terminal to which the biometrics application program has been transmitted creates an area for storage of the biometrics information, according to a specification of the storage area.

In this invention, it is preferable that the writing step has a step of writing the biometrics information as well as individual information for the user to enable use of biometrics.

In this invention, it is preferable that the writing step has a step of writing the biometrics information as well as account information for the user to enable use of biometrics.

In this invention, it is preferable that the biometrics authentication method have a step, when the verification result is satisfactory, in which transaction processing is performed at the service terminal using the contact-free communication functions of the portable communication terminal.

The biometrics application program is transmitted from the server to the portable communication terminal, an authenticated biometrics information area is created, and the biometrics information on the individual card of the user is stored in a common area of the portable communication terminal. By this means, since a portable communication terminal has functions of an individual card storing biometrics information, the portable communication terminal can be used as an individual card for biometrics authentication. Consequently the process of issuing a portable communication terminal having biometrics authentication functions is simplified, and the cost of issuing can be reduced.

DESCRIPTION OF THE PREFERRED EMBODIMENTS

Below, embodiments of the invention are explained in the order of a biometrics authentication system, processing to register biometrics authentication functions for a portable communication terminal, processing for registration and use of biometrics data in a portable communication terminal, and other embodiments. However, this invention is not limited to these embodiments.

Biometrics System

Figure 1:
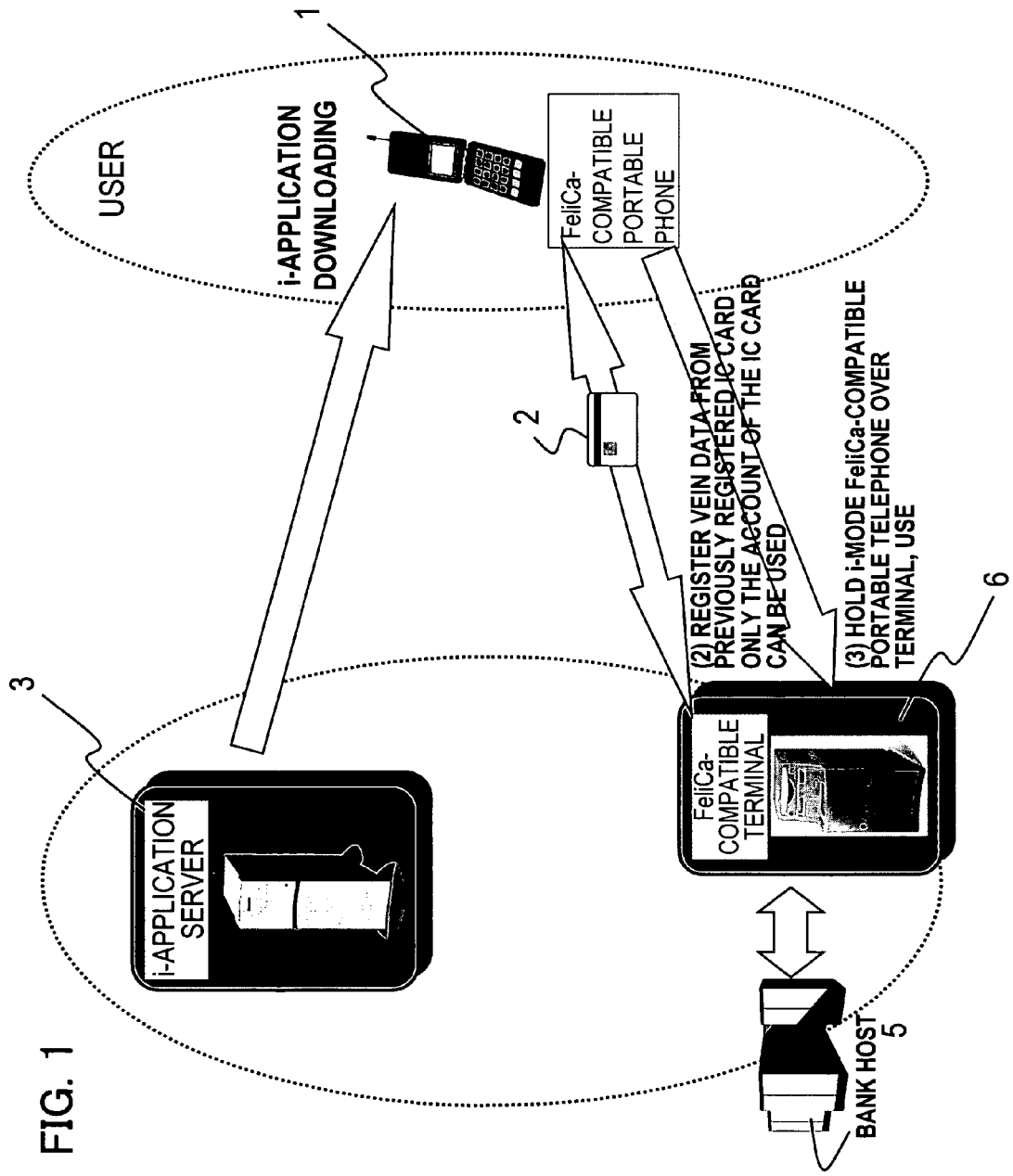
FIG. 1 shows the configuration of the biometrics authentication system of one embodiment of the invention.
Figure 2:
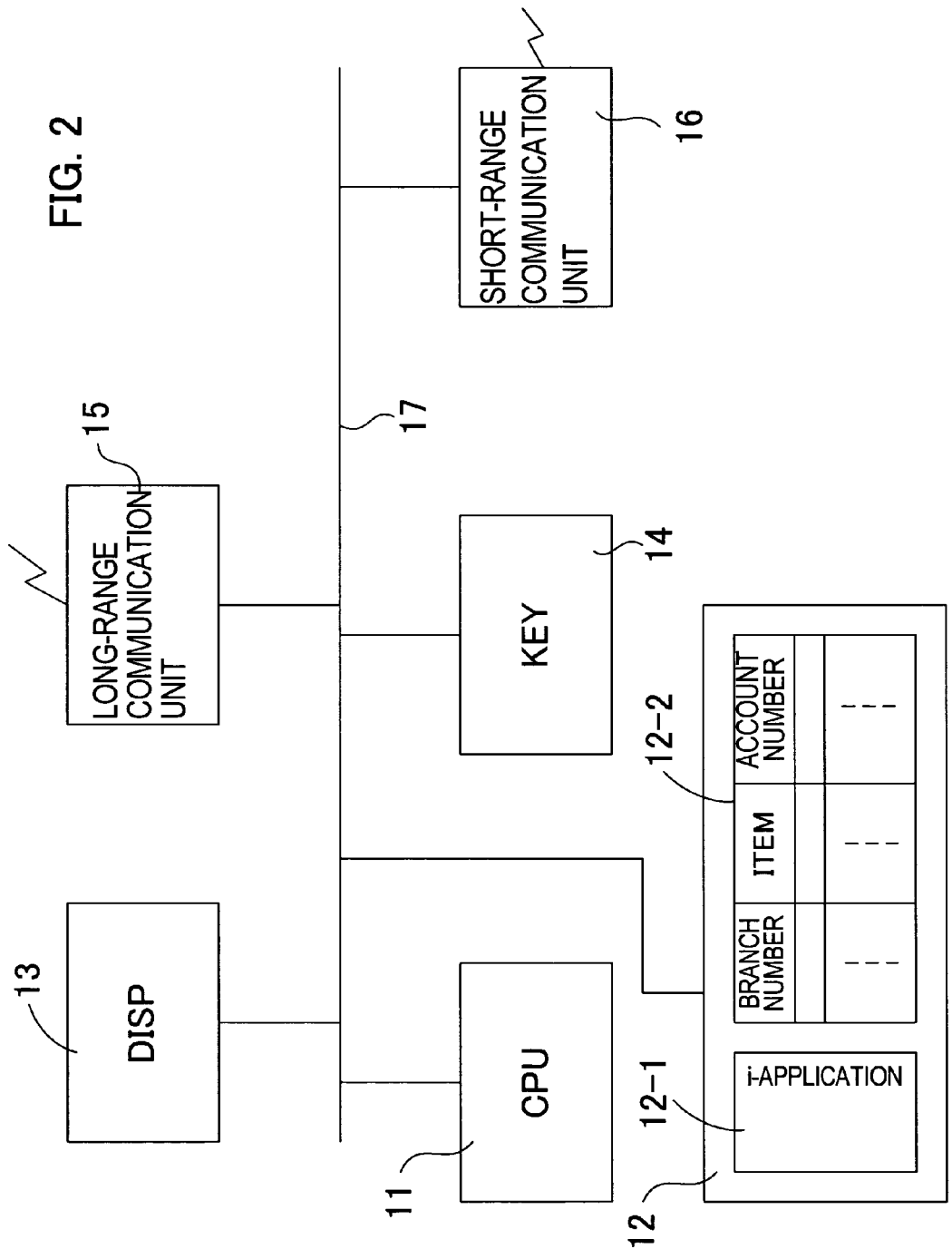
FIG. 2 shows the configuration of the portable communication terminal of FIG. 1.
Figure 3:
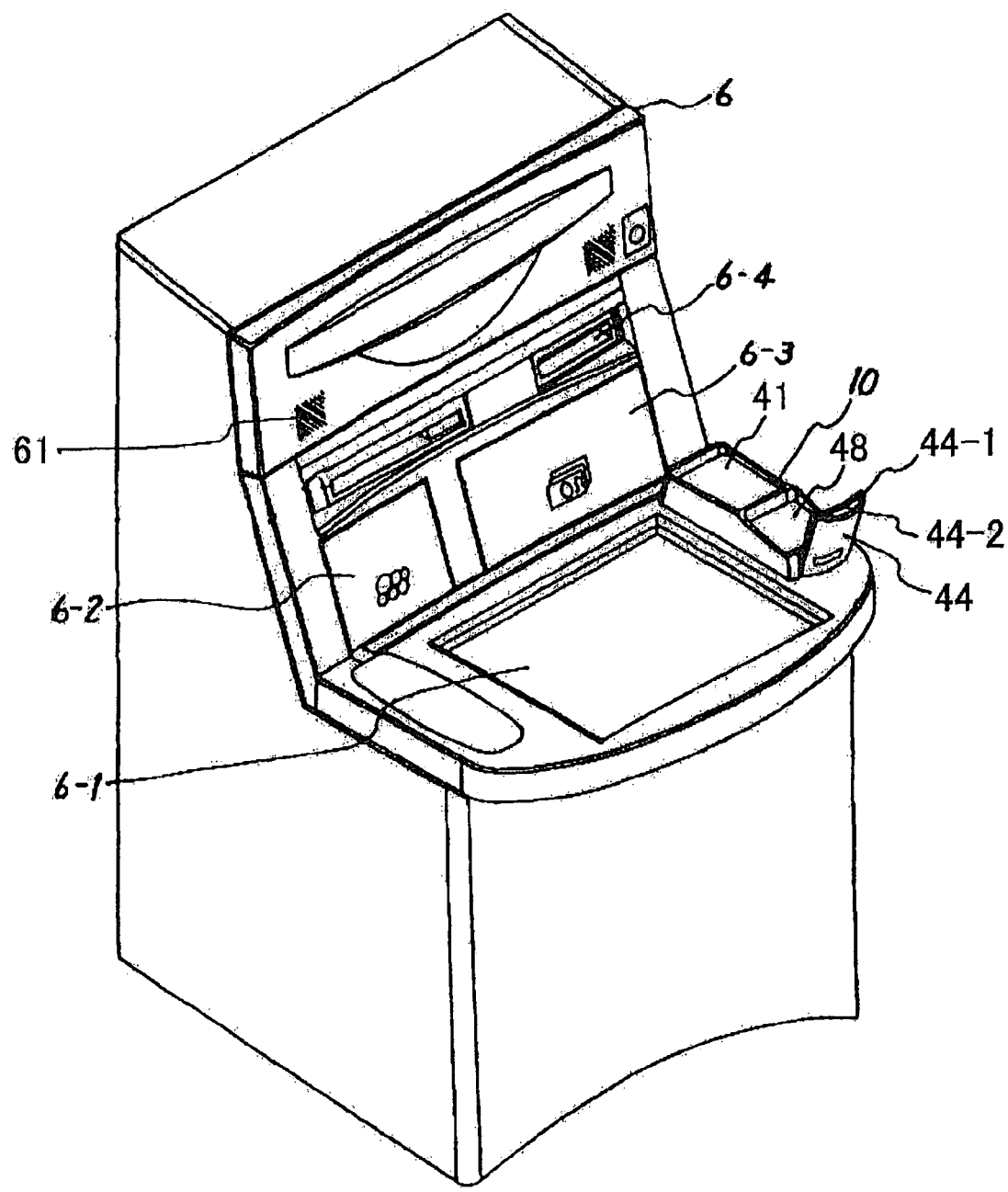
FIG. 3 is an external view of a terminal supporting the portable communication terminal of FIG. 1.
Figure 4:
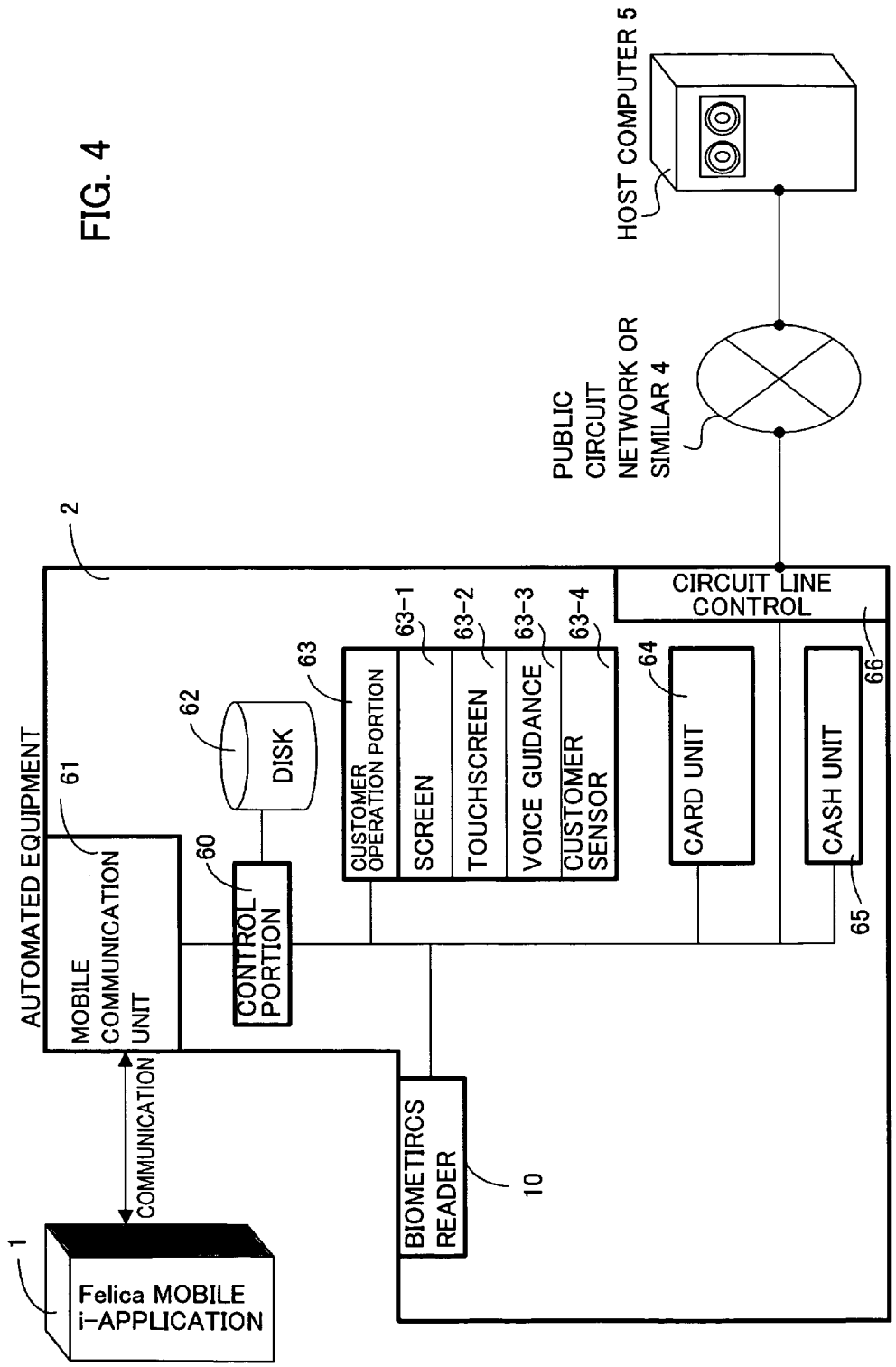
FIG. 4 is a block diagram of the terminal of FIG. 3.
Figure 5:
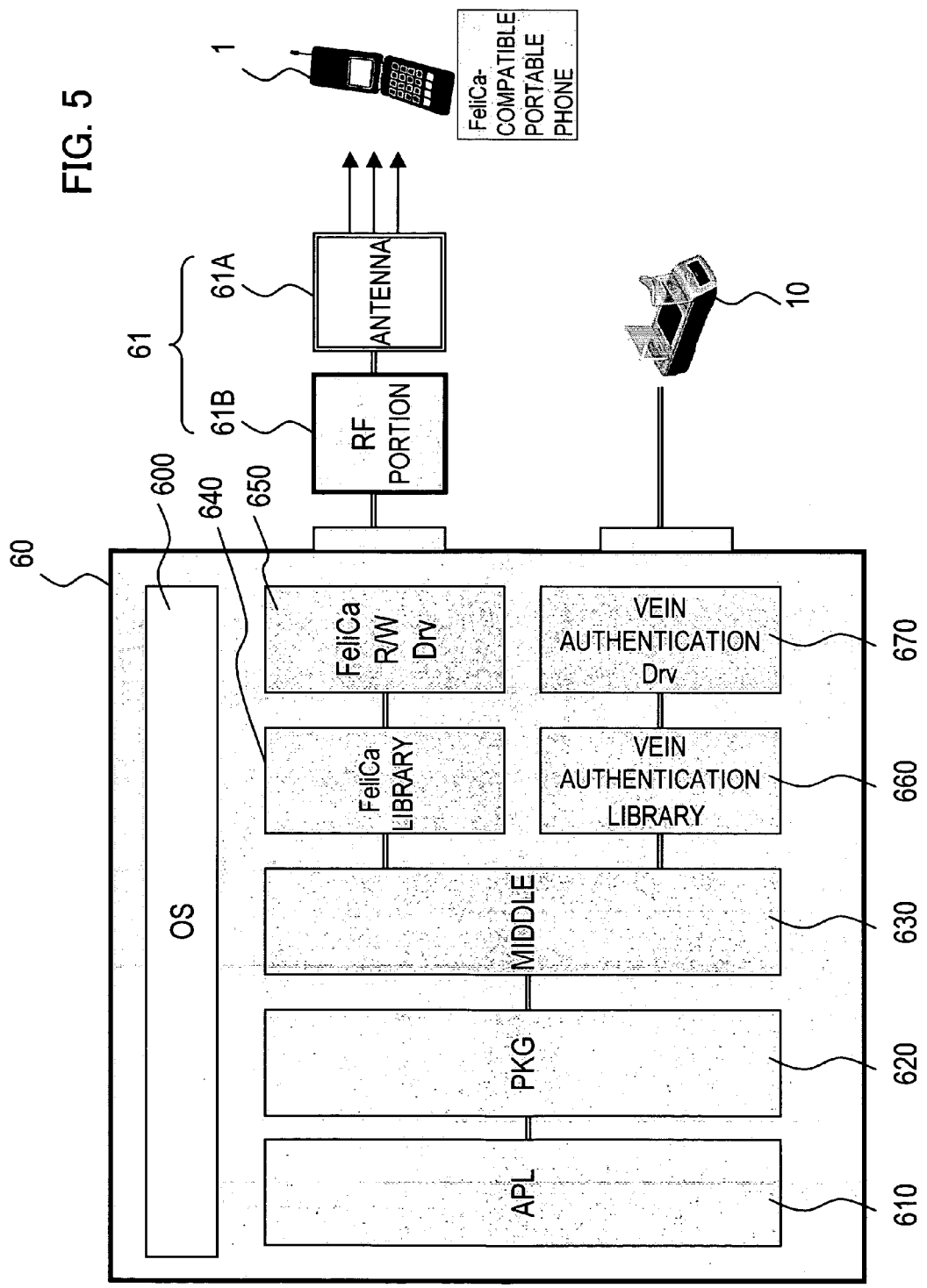
FIG. 5 is a block diagram of the biometrics authentication mechanism of the terminal of FIG. 4.

FIG. 1 shows the configuration of the biometrics authentication system of one embodiment of the invention, FIG. 2 shows the configuration of the portable communication terminal to which biometrics authentication functions have been added in FIG. 1, FIG. 3 is an external view of the automated teller machine of FIG. 1, FIG. 4 shows the configuration of the automated teller machine of FIG. 3, and FIG. 5 shows the configuration of the biometrics authentication mechanism in the automated transaction machine of FIG. 4. The biometrics authentication system in FIG. 1 is an example of a financial system using an ATM (Automated Teller Machine), such as are used by financial institutions.

As shown in FIG. 1, the portable communication terminal 1 is a portable telephone having functions for data reading and writing to and from a contact-free IC card. As explained below using FIG. 2, it is suitable that this portable telephone 1 support the Felica (a registered trademark) standard. For example, the F901i (manufactured by Fujitsu Ltd.) provided by NTT DoCoMo is equipped with a FeliCa-compatible i-application.

A Felica-compatible terminal 6 comprises an automated cash transaction machine, explained in FIG. 3 and FIG. 4. An i-application server 3 communicates with the portable communication terminal 1 over a packet network, and in response to access by the portable communication terminal 1, secures a common area for an i-application in the portable communication terminal 1, and transmits the biometrics application program. A bank host 5 connects to the Felica-compatible terminal 6 and executes transaction processing based on biometrics authentication using the portable communication terminal 1.

The user of the portable communication terminal 1 has an IC card 2 issued by the financial institution. This IC card 2 stores biometrics information (for example, vein data)

acquired through image capture by a biometrics image capture device, account information, individual information, and similar.

The automated transaction machine 6 has a biometrics image capture device 10, described below, and a Felica reader/writer 21. This biometrics image capture device 10 acquires vein data (from for example the palm, back of the hand, or fingers) from the body as biometrics information. The Felica reader/writer 21 communicates with a Felica chip in the portable communication terminal 1, and reads and writes data to and from the portable communication terminal 1.

The automated transaction machine 6 reads biometrics information, account information and similar from the IC card 2 of the user, and registers the information in the portable communication terminal 1. This automated transaction machine 6 is connected to the bank host 5, and executes this registration processing.

As indicated in FIG. 2, the above-described portable terminal 1 has a display unit 13, key input unit 14, long-range communication unit (mobile communication unit) 15, CPU 11, memory 12, short-range communication unit (FeliCa chip) 16 with contact-free IC card specifications, and a bus 17 connecting these units.

This portable terminal 1 has browser functions, voice telephony functions, i-application execution functions, and contact-free IC card functions. The CPU 11 starts these functions in response to key operation of the key input unit 14. The memory 12 has an i-mode (a registered trademark) application program area 12-1, and a common area 12-2 to store account numbers for which transactions can be performed, biometrics information, and similar. This common area 12-2 is an authenticated area which can be used by the Felica chip 16, and as explained below, is allocated as an area for use by a biometrics application program through a Felica usage request.

As shown in FIG. 3 and FIG. 4, the automated transaction machine 6 has a control unit 60, memory (magnetic disk device) 62, customer operation unit 63, card unit 64, cash unit 65, circuit line control unit 66, and biometrics image capture unit 10 (here, a vein sensor).

The card unit 64 reads the magnetic card/IC card 2 inserted through the card insertion/ejection aperture 6-4 shown in FIG. 3, and returns the card through the aperture. Also, the card unit 64 optically reads (the embossed portion of) a card by optical means. The card unit 64 also uses a printing head to print the transaction result on a receipt form, and the printed receipt is ejected through the card insertion/ejection aperture 6-4.

The UOP unit (customer operation unit) 63 has a display 6-1 with touchscreen (image display portion 63-1 and touchscreen for key input 63-2), a voice guidance unit 63-3, and a customer sensor 63-4.

The cash unit 65 is constructed of a recycling-type paper currency/coin insertion/dispensing device, and has a paper currency/coin counting unit which validates and counts paper currency or coins which have been inserted through the paper currency/coin insertion apertures 6-2, 6-3 in FIG. 3; a paper currency housing portion (stacker) which stacks paper currency/coins; and a unit control portion which performs deposit operations to stack in the stacker counted paper currency and coins, picks up any requested paper currency and coins from the stacker, and dispenses paper currency and coins through the paper currency/coin insertion/dispensing apertures 6-2, 6-3.

The circuit line control unit 66 communicates with the host computer 5 (host of the financial institution) via public circuit lines 4 or similar. The control unit 60 uses programs and data in the memory 62 to control the customer operation unit 63, card unit 64, cash unit 65, and circuit line control unit 66.

Further, the automatic transaction machine 6 has a mobile communication unit 61 which communicates with the portable communication terminal 1. The mobile communication unit 61 comprises a contact-free IC card reader/writer described in FIG. 5, and connected to the control unit 60. The control unit 60 is equipped with software 600 to 670, explained in FIG. 5.

The automated transaction machine 6 of FIG. 3 and FIG. 4 has, on the side of the display with touchscreen 6-1, a vein sensor 10 serving as a biometrics image capture unit. The vein sensor 10 has a sensor unit 48 and, provided in front, a front guide 44 to support the wrist of the user and a flat portion 41.

The front guide 44 has a support portion 44-1 which in turn has a curved portion 44-2 conforming to the shape of the wrist; this support portion 44-1 serves to position the palm of the hand above the sensor unit 48. The sensor unit 48 emits infrared rays which are incident on the palm, and receives the light reflected from the palm, which is converted into electrical signals (image capture data). That is, as is well known, an image of the blood vessels (for example, a vein image) of the user's body is acquired.

Next, the biometrics mechanism installed in the control unit of FIG. 3 and FIG. 4 is explained, referring to FIG. 5. As indicated in FIG. 5, the mobile communication unit 61 comprises an antenna 61A and a RF (Radio Frequency) unit 61B, for use in wireless communication with the Felica chip in the portable communication terminal 1.

Further, the control unit 60 has, as software, a Windows (a registered trademark) or other OS (Operating System) 600, an application program for transaction processing 610, package software 620, and middleware 630.

Moreover, the control unit 60 has a vein authentication driver 670, which drives the biometrics image capture unit 10 (here, a vein sensor); a vein authentication library (program) 660, which performs vein authentication processing; a Felica R/W driver 650, which drives the Felica reader/writer 61; and a Felica library (program) 640, which performs processing of data from the Felica chip 16.

As shown in FIG. 1, in this invention the vein (biometrics) application program is downloaded from the i-application server 3 to the portable communication terminal 1, and an authenticated biometrics information area is created. The user brings the portable communication terminal 1 and IC card 2 to the automated transaction machine 6, causes his own biometrics information to be captured as an image, and upon individual authentication, stores the biometrics data (vein data) and account information in the IC card 2 in the common area 12-2 of the portable communication terminal 1. By this means, the portable communication terminal 1 has the functions of the individual card storing biometrics information, and the process of issuing a card for biometrics ends.

Thereafter, the user causes the automated transaction machine 6 to read the portable communication terminal 1, performs individual authentication based on biometrics, and executes automated transactions for an account. As a result the process of card issuing is simplified. The costs incurred in the issuing process can also be reduced, and biometrics processing can be realized.

Figure 6:
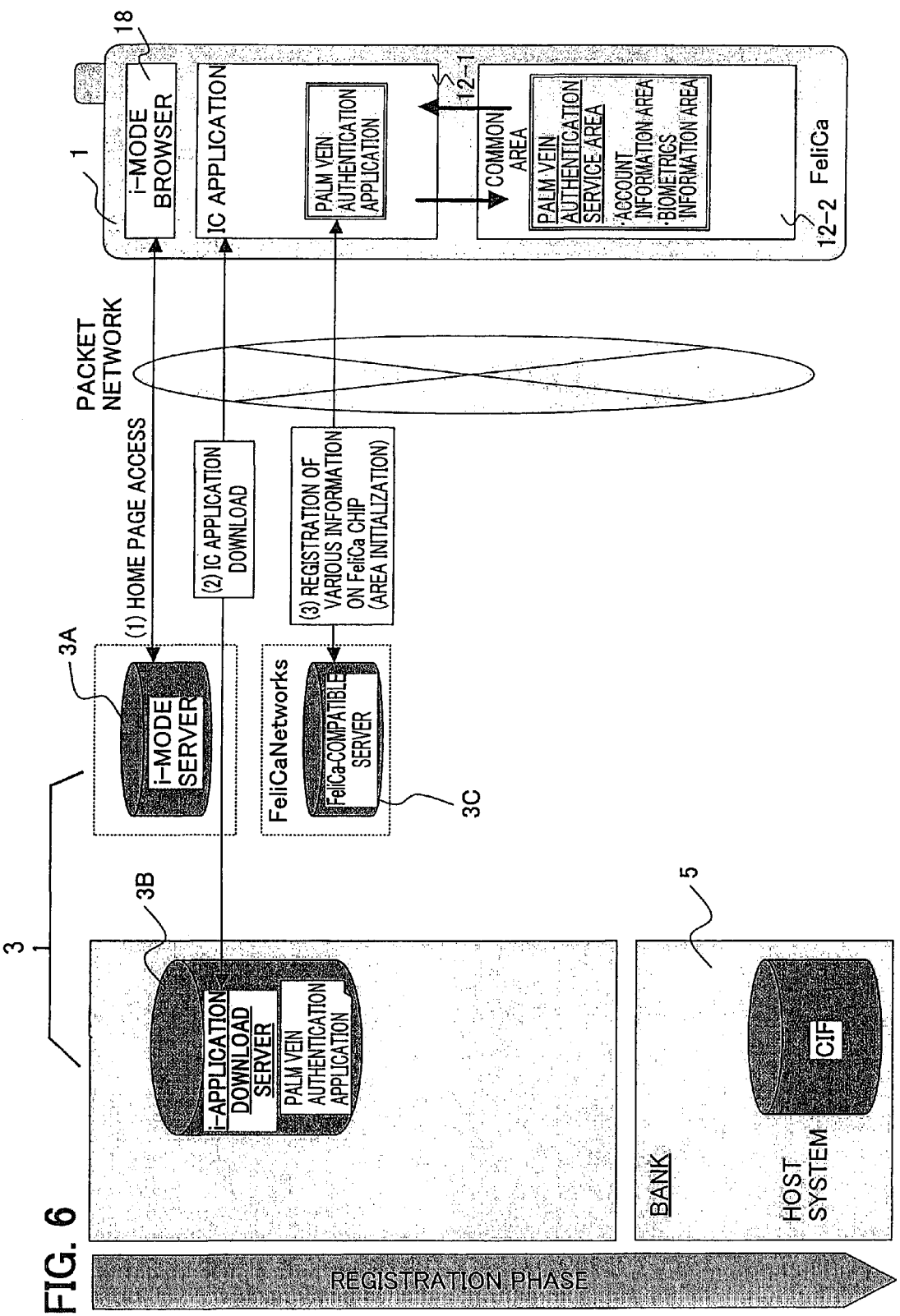
FIG. 6 shows the flow of registration processing of the biometrics application program of FIG. 1.
Figure 7:
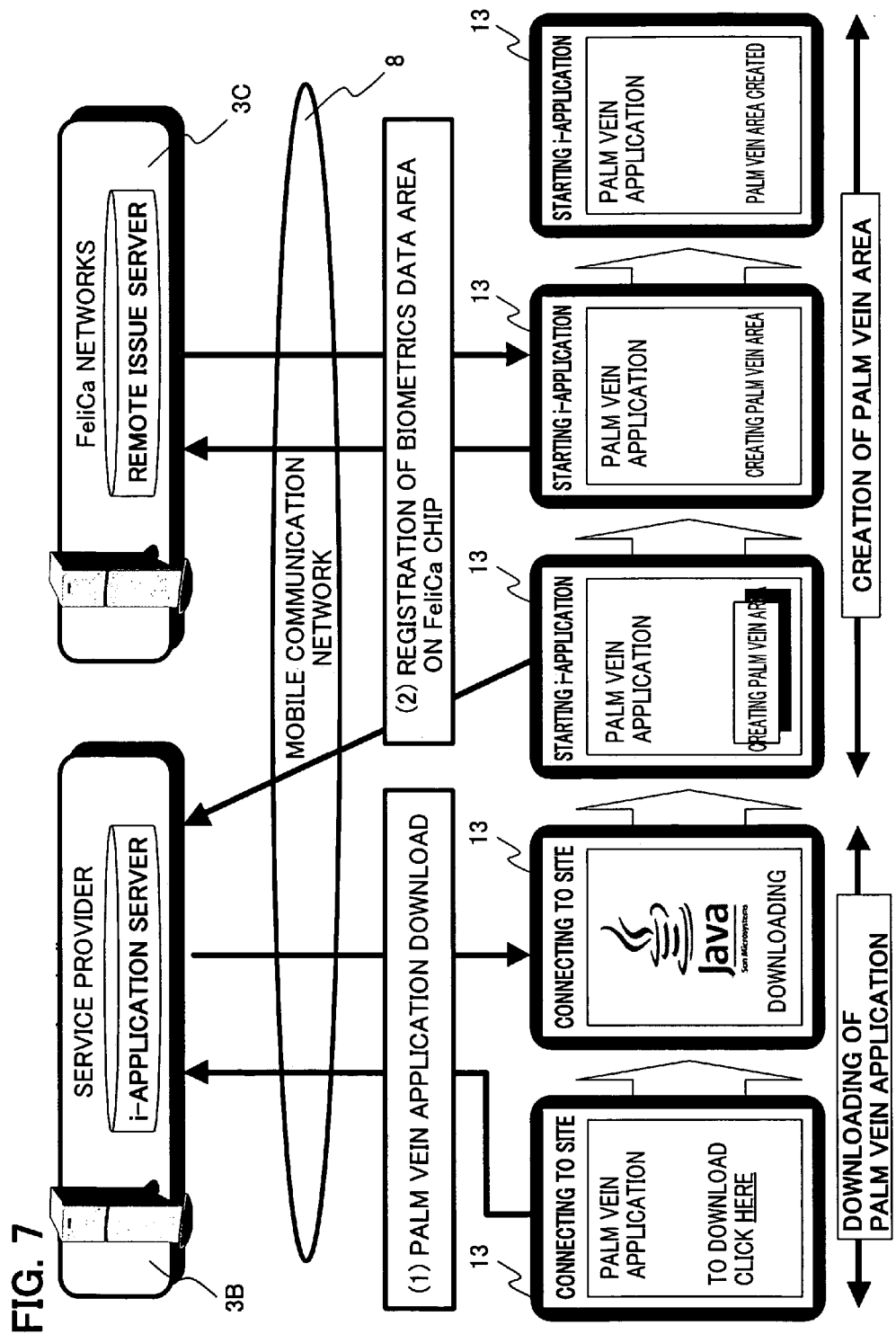
FIG. 7 explains the registration processing of FIG. 6.

Processing To Register Biometrics Functions For A Portable Communication Terminal FIG. 6 shows the flow of registration processing of a portable communication terminal in an embodiment of the invention, and FIG. 7 explains the operation thereof. As shown in FIG. 6, the i-application server 3 comprises an i-mode server 3A, i-application download server 3B, and Felica-compatible server 3C. First the vein authentication application is registered on the i-application download menu of the i-mode (registered trademark), and the common area 12-2 in the Felica chip 16 is secured.

That is, a user submits an application to a service company which operates a Felica network, and obtains allocation of a specific area in the common area 12-2 and a vein authentication application ID (identifier). The Felica service company stores the allocated ID, area, and registration data necessary for initialization on a Felica-compatible server 3C. In addition, a vein application is registered on an i-application download menu of an i-mode server 3A.

As indicated in FIG. 6, the user accesses an i-mode web page of the i-mode server 3A using an i-mode browser 18 of the portable communication terminal 1. Thereby, the site of the vein authentication application can be selected as an i-application from the portable communication terminal 1.

As shown in FIG. 7, the user operates the portable communication terminal 1 to connect via the mobile communication network 8 to the download site (on the i-application download server) 3B for the vein authentication application, upon which a screen indicating connection with the site is displayed on the display unit 13 of the portable communication terminal 1. The user performs notification authentication using the manufacturing number of the portable communication terminal 1, inputs an authentication number or similar as necessary, and operates the download menu. Thereby, the vein authentication application program is downloaded from the i-application server 3B to the portable communication terminal 1 and is stored in the memory 12. Registration information may be stored on the Felica server 5A in FIG. 8 below, and may be verified at the time of biometrics registration.

Next, the user starts the vein authentication application program downloaded to the portable communication terminal 1, thereby the portable communication terminal 1 connects to the Felica server 3C using an URL (Universal Address Locator) embedded in the vein authentication application program. The Felica server 3C transmits to the portable communication terminal 1 various registration information for the Felica chip 16 (including memory 12), according to the above-described allocated ID from the portable communication terminal 1.

Upon receiving this information, the portable communication terminal 1 creates a vein authentication service area in the common area 12-2, and registers this area in the Felica chip 16. For example, a screen for the process of creation of a palm vein area such as in FIG. 7 is displayed in the display unit 13 of the portable communication terminal 1, and a vein authentication service area (account area and biometrics information area) is created in the common area 12-2, as shown in FIG. 6.

Here, the palm vein authentication application program performs mutual authentication via the Felica reader/writer 21, thereby area access is limited, and reading/writing of this allocated vein authentication service area is performed according to instructions following above mutual authentication. As described below, biometrics authentication functions are provided by means of which biometrics information (vein data) registered in the biometrics information area of the common area 12-2 may be compared with biometrics information obtained via the Felica reader/writer 21.

In this way, the vein authentication application program is downloaded from a web site to the portable communication terminal 1, and a service area is created in the Felica chip 16. Access to this service area by the vein authentication application program is limited, so that security functions can be imparted, and moreover biometrics media functions can be imparted to the portable communication terminal 1. Hence preparations to issue a card for biometrics can be performed anywhere, and at any time, through user operations.

Figure 8:
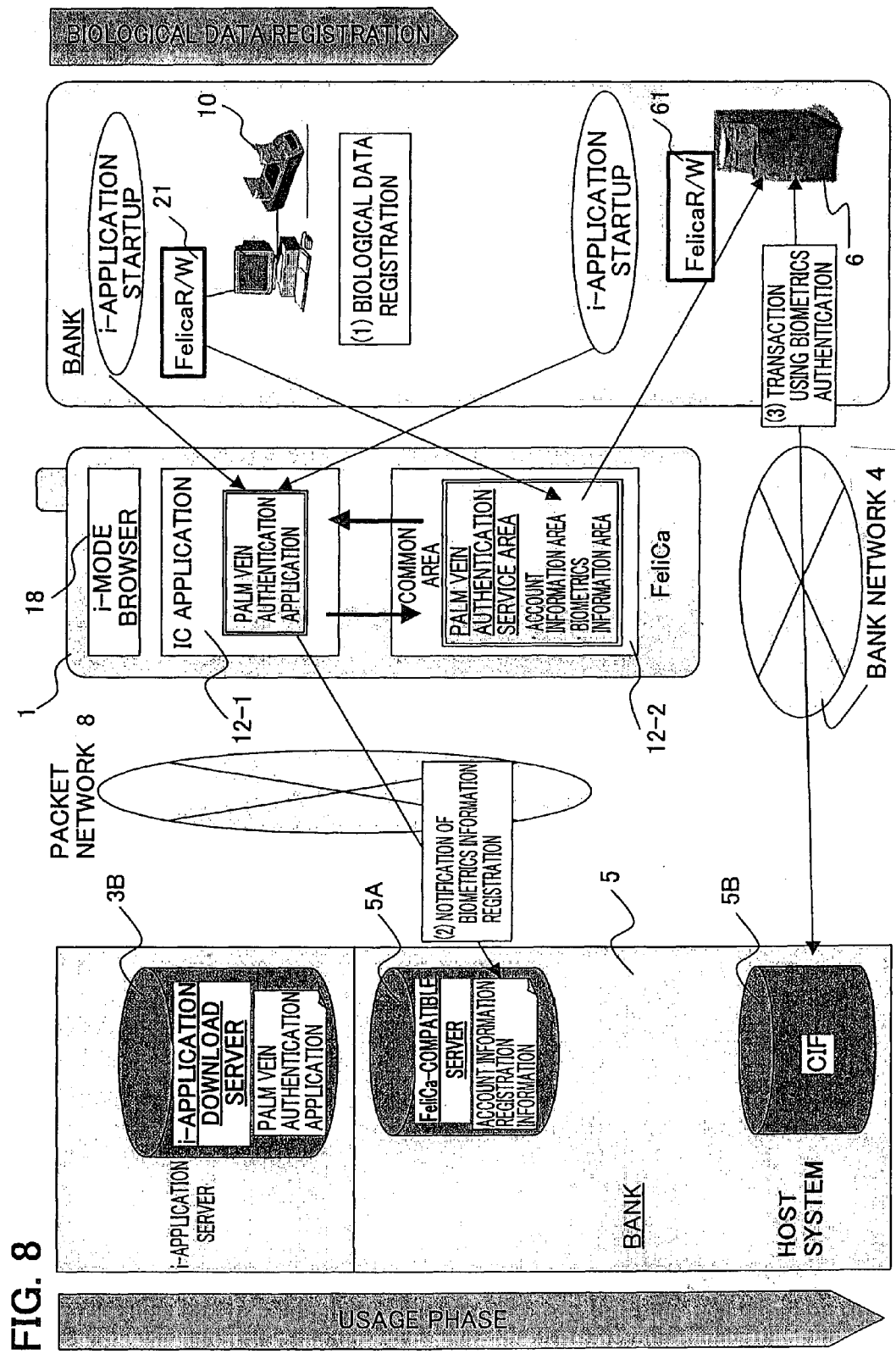
FIG. 8 explains the biometrics information registration/use processing of FIG. 7.
Figure 9:
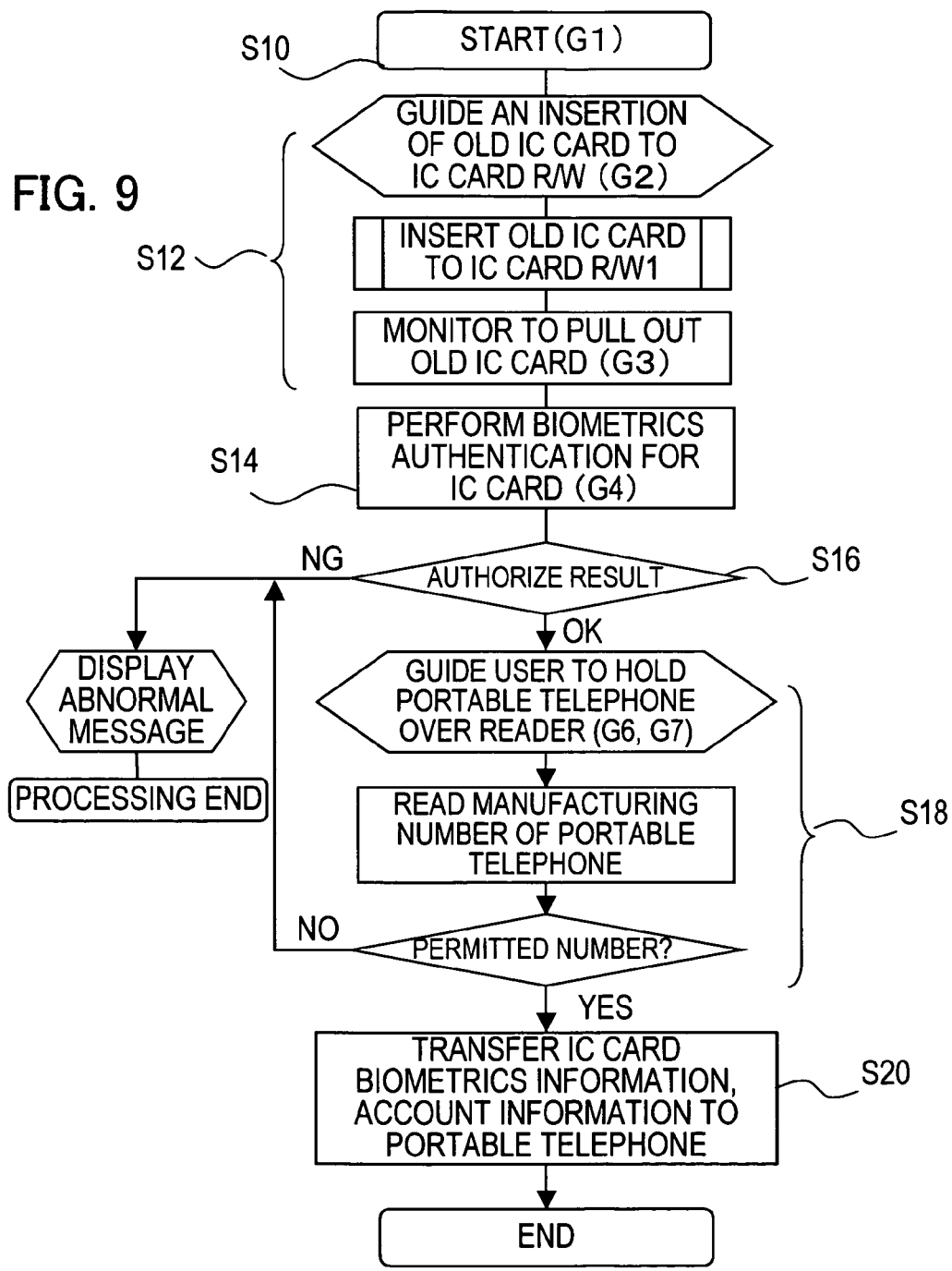
FIG. 9 shows the flow of biometrics information registration processing in FIG. 8.

Processing for Registration and Use of Biometrics Data in a Portable Communication Terminal Next, FIG. 8 through FIG. 12 are used to explain processing for biometrics data registration and usage by a portable communication terminal. FIG. 8 shows the flow of processing for biometrics data registration and biometrics by a portable communication terminal in an embodiment of the invention; FIG. 9 shows the flow of biometrics data registration processing; and FIG. 10 explains guidance screens for registration processing.

First, biometrics data registration processing is explained. As indicated in FIG. 1, a user carries a portable communication terminal 1 in which is registered the above-described vein application program and an IC card 2, and uses an automated transaction machine 6, shown in FIG. 8 The user inserts the IC card 2 into the automated transaction machine 6. The automated transaction machine 6 provides guidance prompting the user to hold a hand over the biometrics image capture unit 10. The biometrics image capture unit 10 then acquires an image of the veins in the palm of the user's hand. The automated transaction machine 6 verifies the vein data on the IC card 2 against the vein data obtained through image capture to authenticate the individual. This verification processing may be performed within the IC card 2.

Upon authentication of the individual, the user holds his portable telephone (portable communication terminal) 1 with contact-free IC card functions (for example FeliCa functions) over the Felica reader/writer 61 of the automated transaction machine 6. The automated transaction machine 6 and the portable telephone 1 perform mutual authentication by means of the Felica library 640, and when the mutual authentication is satisfactory, the i-application of the portable telephone 1 is started. By this means, the vein authentication application program of the portable telephone 1 is started. A selection menu displaying "Cash card transaction", "Registered account enquiry", and "Biometrics registration" is displayed on the display unit of the portable telephone 1.

At this screen, when the user selects "Biometrics registration" or when the "biometrics registration" i-application is started in the automated transaction machine 6, the automated transaction machine 6 writes the vein data, account data and similar on the IC card 2 to the common area 12-2 managed by the vein authentication application program of the portable phone 1 via the Felica library 640, using the Felica reader/writer 21, in response to the selection of biometrics registration.

Through completion of registration, the automated transaction machine 6 notifies the CIF (Customer Information File) 5B in the bank host 5 of the registration of biometrics information, via the bank network 4 as shown in F*ig*. 8. That is, the account information and registration Information are stored in the CIF 5B.

In this way, biometrics information is registered in the portable telephone 1, so that transactions and similar based on biometrics become possible.

Figure 10:
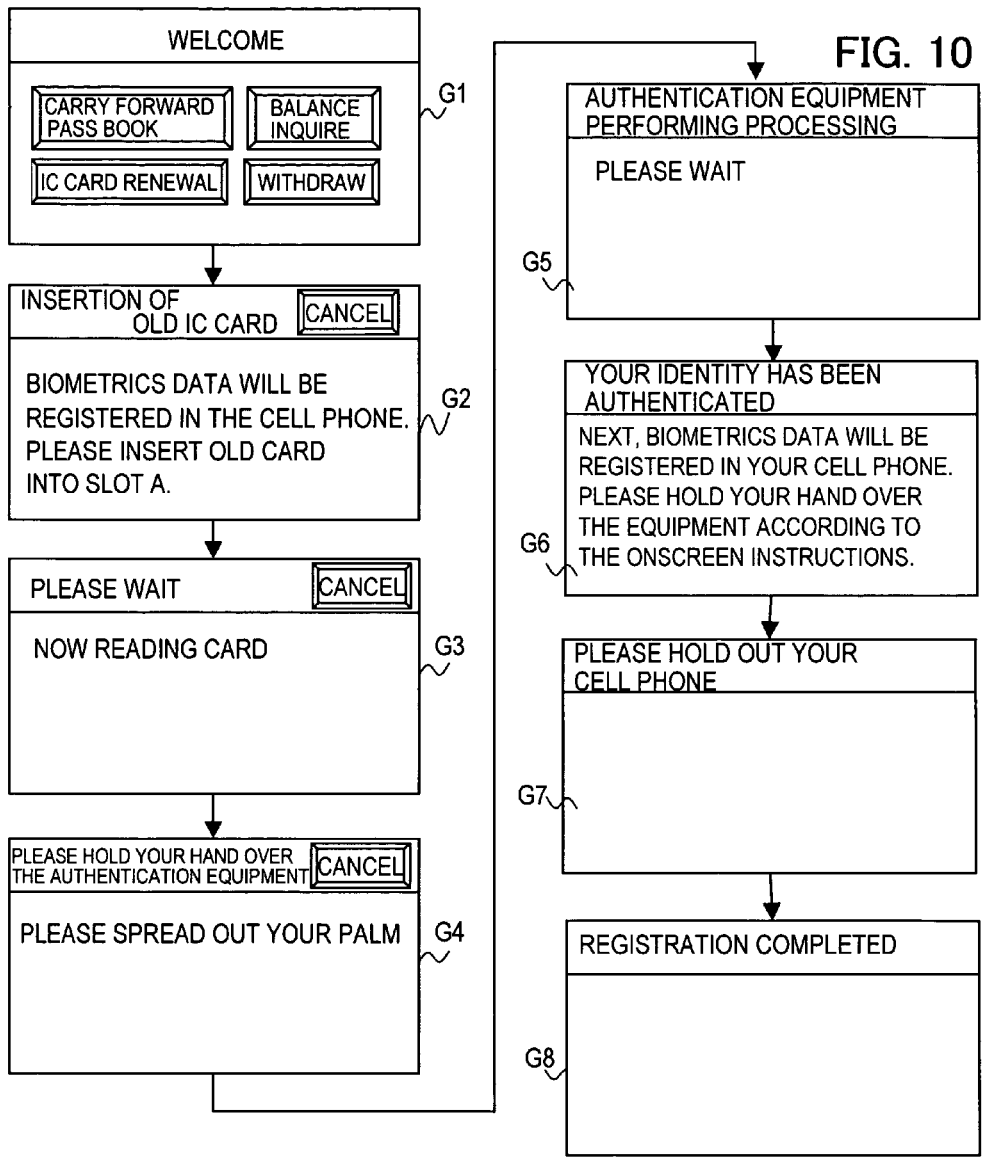
FIG. 10 shows guidance screens for the biometrics information registration processing of FIG. 9.

Next, processing to register biometrics data in the portable terminal is explained using FIG. 9, and referring to FIG. 10.

(S10) Selection icons for the normal card transactions of "Deposit", "Withdrawal", "Balance inquiry", and "Update bankbook", together with "Portable telephone registration", which registers the portable telephone, are displayed on the customer operation unit 63 of the automated transaction machine 6, as the transaction selection screen G1 (see FIG. 10).

(S12) At the displayed transaction selection screen G1, when the user selects "Portable telephone registration", the automated transaction machine 6 displays on the customer operation unit 63 a guidance screen G2 prompting for insertion of the IC card 2 into the card insertion aperture 6-4. The user inserts his IC card 2 into the card insertion aperture 6-4 in accordance with this screen G2. The automated transaction machine 6 reads the contents of the IC card 2, and monitors removal of the IC card 2. At this time, the automated transaction machine 6 displays a screen G3 on the customer operation unit 63 indicating that the card is being read.

(S14) The ATM 6 displays a palm vein readout guidance screen G4 on the customer operation unit 63. In response, the user holds the palm of his hand over the vein sensor 10. The vein sensor 10 reads an image of the veins in the palm, and sends the image to the vein authentication library 660 of the ATM 6. The vein authentication library 660 extracts the characteristics of the vein pattern from the vein image, and creates biometrics data (vein data). The vein authentication library 660 of the ATM 6 then verifies the read-out vein data against the vein data registered in the IC card 2, performs confirmation of verification, and displays a screen G5 indicating that authentication is progress on the customer operation unit 63.

(S16) In the event of authentication failure, authentication is retried; if authentication fails even after a prescribed number of retries, an error message is displayed, and processing ends.

(S18) If on the other hand authentication is successful, the ATM 6 displays guidance screens G6 and G7 prompting the user to hold the portable telephone 1 over the Felica sensor 61. The user holds the short-range communication unit 16 of the portable Telephone 1 over the mobile communication unit 61 of the ATM 6, and, through a well-known contact-free IC card read/write sequence, a manufacturing number of other ID is transmitted from the short-range communication unit 16 to the mobile communication 61 of the ATM 6 by contact-free means. Upon receiving this information, the ATM 6 queries the host 5 and judges whether an application for biometrics authentication has been submitted (approved) for the manufacturing number. If there has not been approval for the manufacturing number, the automated transaction machine 6 displays an error message, and processing ends.

(S20) If on the other hand approval has been granted for the manufacturing number of the portable telephone 1, the automated transaction machine 6 uses the Felica reader/writer 21 to write the biometrics data (vein data), account data and similar on the IC card 2 to a common area 12-2 managed by the vein authentication application of the portable telephone 1 via the Felica library 640. Upon completion of this registration, the ATM 6 displays a registration completion screen G8 on the customer operation unit 63, and processing ends.

Upon this registration completion, the automated transaction machine 6 notifies the CIF 5B of the financial institution of the biometrics information registration, as shown in FIG. 8. That is, the CIF 5B stores the account information and registration information. Thus biometrics information is registered in the portable telephone 1, and biometrics-based transactions and similar become possible.

Figure 11:
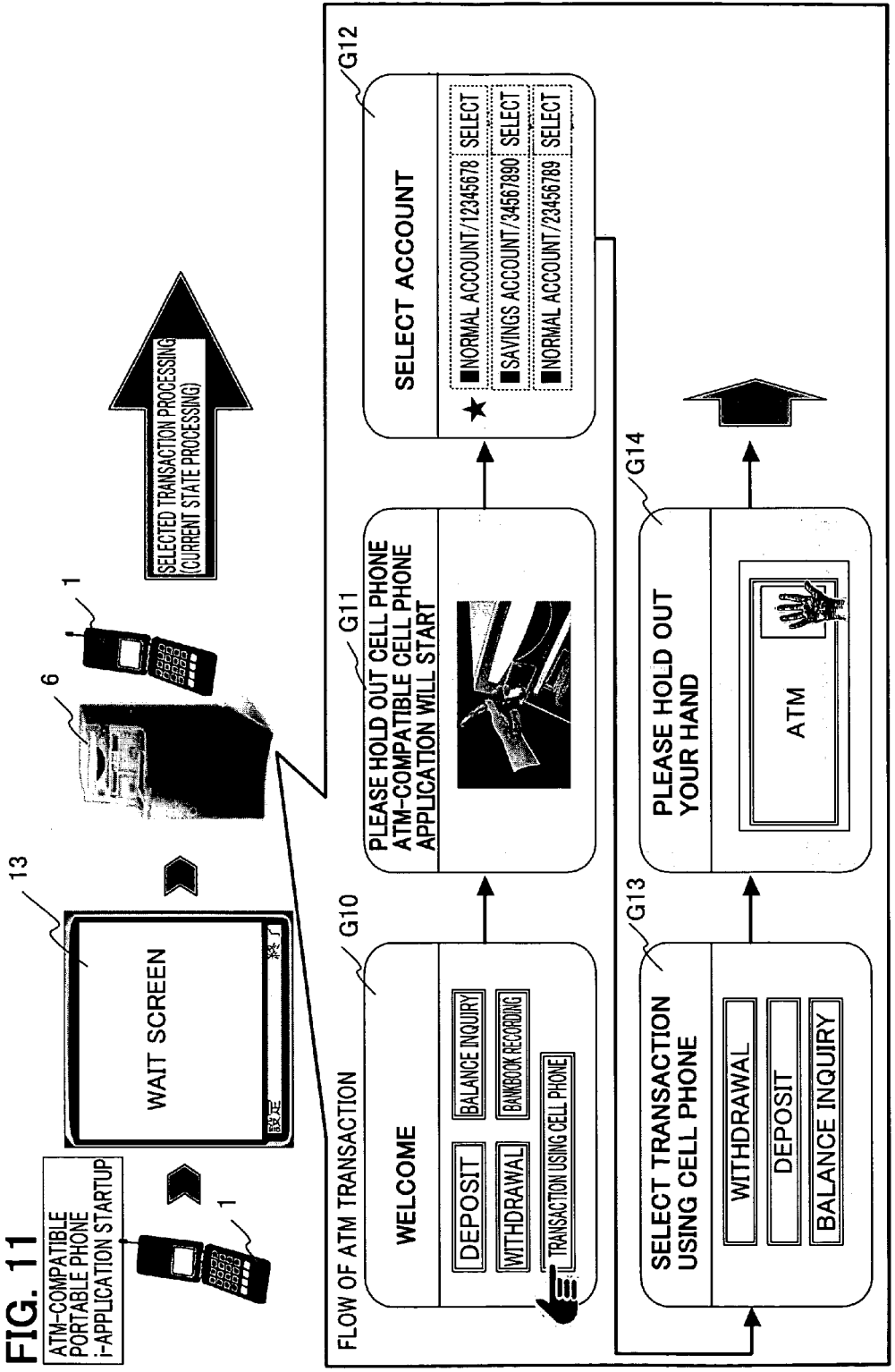
FIG. 11 explains transaction processing based on the biometrics authentication of FIG. 9.
Figure 12:
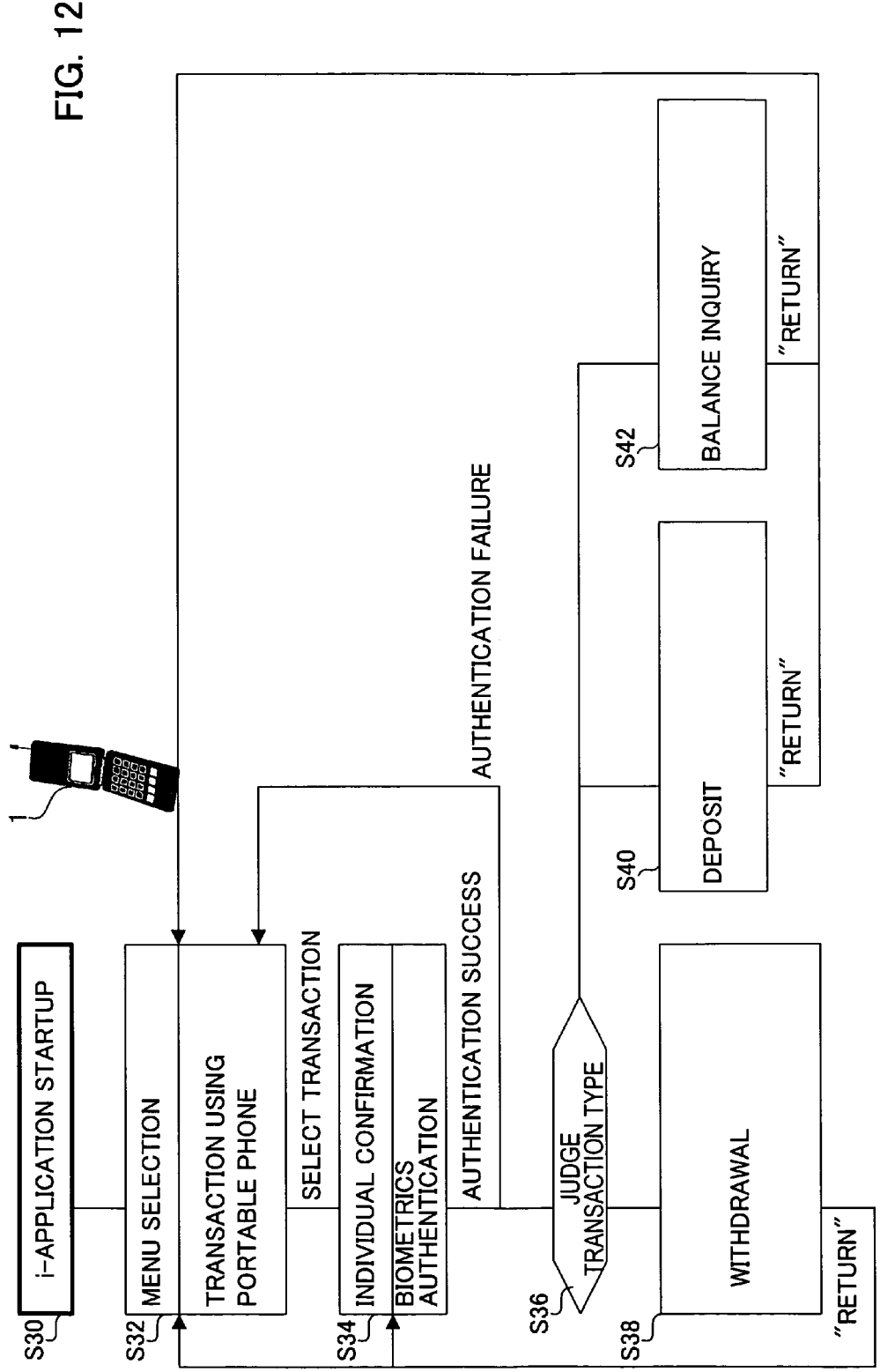
FIG. 12 shows the flow of transaction processing by the portable communication terminal of FIG. 11.

Next, FIG. 11 and FIG. 12 are used to explain biometrics processing.

(S30) As shown in FIG. 11, when the user presses an i-application key on the key input unit 14 of the portable terminal 1, the CPU 11 starts the i-application and displays an i-application standby screen on the display unit 13. The automated transaction machine 6, on the other hand, displays selection icons for the normal card transactions "Deposit", "Withdrawal", "Balance inquiry" and "Write bankbook", as well as the portable telephone transaction "Transaction using portable phone", on the customer operation unit 63 as the transaction selection screen G10.

(S32) When the user selects "Transaction using portable phone" on the displayed transaction selection screen G10, the automated transaction machine 6 displays a guidance screen G11 on the customer operation portion 63 prompting the user to hold a portable telephone 1 over the Felica sensor 21. The user holds the short-range communication unit 16 of the portable telephone 1 over the mobile communication unit 61 of the ATM 6, whereupon a well-known contact-free IC card read/write sequence is used to transmit, by contact-free means, the above-described account numbers, biometrics information and similar from the short-range communication unit 16 to the mobile communication unit 61 of the ATM 6. The ATM 6, upon receiving this information, displays the account selection screen G12 on the customer operation unit 63. This account selection screen G12 lists the account numbers transmitted from the above-described portable telephone 1. When the user selects the account for the transaction from the customer operation unit 63, a screen G13 for selection of a transaction using a portable telephone is displayed on the customer operation unit 63. This transaction selection screen G13 displays only the above-described transactions which can be performed automatically using the portable telephone 1. Here, only "Withdrawal", "Deposit", and "Balance inquiry" can be selected.

(S34) When the user selects a transaction from the customer operation unit 63, the ATM 6 displays a guidance screen G14 for palm vein readout on the customer operation unit 63. In response, the user holds his palm over the vein sensor 10. The vein sensor 10 reads an image of veins in the palm, and transmits the image to the vein authentication library 660 of the ATM 6. The vein authentication library 660 extracts the vein pattern characteristics from the vein image, and creates biometrics data (vein data). The vein authentication library 660 of the ATM 6 then verifies the read-out vein data against the vein data registered in the portable telephone 1, and performs confirmation. In the event of authentication failure (not success), a retry is performed, and if authentication fails even after a prescribed number of retries, the service processing ends, and service processing is obstructed.

(S36) If on the other hand authentication is successful, the ATM 6 judges the type of transaction selected using the portable telephone in step S32.

(S38) In response to selection of withdrawal, the ATM 6 executes well-known withdrawal processing. For example, a monetary amount input screen is displayed on the customer operation unit 63, the user is prompted to input an amount, and when the end of amount input is detected, a monetary amount confirmation screen is displayed on the customer operation unit 63. When the control unit 60 detects the pressing of the confirmation key, a screen indicating communication with a computer is displayed on the customer operation unit 63.

During this interval, the control unit 60 transmits the account data and monetary amount selected to the host computer 5 via the circuit line control unit 66, and obtains a response from the host computer 5. When the response from the host computer 5 permits withdrawal, the control unit 60 causes the card unit 64 to issue a receipt, if the user has requested that a receipt be issued. The control unit 60 then instructs the cash unit 65 to dispense cash in the amount input. The cash unit 65 dispenses cash (paper currency) in this amount, upon which the control unit 60 displays a screen indicating the dispensing of paper currency on the customer operation unit 63. Upon detecting that the cash has been removed, the control unit 60 displays a screen indicating the end of the transaction on the customer operation unit 63. Processing then returns to step S32.

(S40) If in step S32 a deposit transaction has been selected, the control unit 60 displays a cash (paper currency) insertion screen on the customer operation unit 63. At this screen, an "Insert bills" guidance message is displayed. The control unit 60 opens the insertion aperture of the cash unit 65. Upon detecting the insertion of paper currency into the insertion aperture of the cash unit 65, the control unit 60 displays a screen indicating that cash is being counted on the customer operation unit 63. During this interval, the cash unit 65 counts the inserted paper currency.

Upon receiving notification of the end of counting from the cash unit 65, the control unit 60 displays a monetary amount confirmation screen on the customer operation unit 63. This screen displays the counted monetary amount and a confirmation key. Upon detecting the pressing of the confirmation key, the control unit 60 displays a screen on the customer operation unit 63 indicating communication with the computer. During this interval, the control unit 60 transmits the selected account data and the counted monetary amount to the host computer 5 via the circuit line control unit 66, and obtains a response from the host computer 5.

When the response from the host computer indicates deposit permission, the control unit 60 has the card unit 64 issue a receipt, if the user has requested that a receipt be issued. The control unit 60 then displays a receipt issued screen on the customer operation unit 63. In this screen, the guidance message "Please take your receipt" is displayed. Upon detecting removal of the receipt, the control unit 60 then displays a transaction ended screen on the customer operation unit 63. Processing then returns to step S32.

(S42) When in step S32 balance inquiry is selected, the control unit 60 displays a screen indicating communication with the computer on the customer operation unit 63. During this interval, the control unit 60 transmits the selected account data to the host computer 5 via the circuit line control unit 66, and obtains a response from the host computer. Upon obtaining a response from the host computer 5, the control unit 60 displays a balance confirmation screen on the customer operation unit 63. On this screen, the account number, the account balance, and a confirmation key are displayed. When the confirmation key is pressed, if a receipt has been requested, the control unit 60 instructs the card unit 64 to print and issue a receipt. The control unit 60 then displays a receipt issued screen on the customer operation unit 63. Upon detecting that the receipt has been removed, the control unit 60 displays a transaction ended screen on the customer operation unit 63. Processing then returns to step S32.

In this way, biometrics data is read from the portable telephone 1, biometrics authentication is performed, and account data is used to execute an automated transaction in the normal manner. In this case, the transaction service is from the portable terminal, so that transaction types are limited to "Withdrawal", "Deposit", and "Balance inquiry". As a result, superfluous transactions are not displayed to the user, for improved user convenience.

As indicated in screen G12 in FIG. 11, a portable terminal 1 can have data for a plurality of accounts, so that there is no need to carry a card for each account. That is, the functions of a plurality of cards can be combined in the portable terminal, and more convenient service can be provided to the user.

Other Embodiments

In the above-described embodiments, biometrics authentication was explained for the case of authentication using palm vein patterns; but application to biometrics authentication using finger vein patterns, blood vessel image patterns of the back of the hand, to palmprints, as well as to facial features, is possible. Further, automated equipment used in financial operations was explained; but application to automated ticket issuing equipment, automated vending equipment, and to automated machines and computers in other areas, as well as to door opening/closing equipment, and to other equipment is possible. Moreover, registration can employ not only automated transaction machines, but automated registration equipment and terminal devices in service areas.

The contact-free communication method of the portable terminal 1 was explained assuming the Felica system; but other IC card contact-free communication methods, as well as other contact-free communication methods, such as infrared rays, can be used. Similarly, portable terminals were explained assuming portable telephones; but PDAs and other portable communication terminals can be used.

A biometrics application program is transmitted from a server to a portable communication terminal, an authenticated biometrics information area is created, and the biometrics information on the individual card of the user is stored in a common area of the portable communication terminal. By this means, the portable communication terminal acquires the functions of an individual card storing biometrics information, and even such a portable communication terminal can be used as an individual card for biometrics authentication. Hence the process of issuing a portable communication terminal having biometrics functions is simplified, and moreover the cost of such issuing can be lowered, contributing to expanded use of biometrics authentication.

What is claimed is:

1. A biometrics authentication method, comprising the steps of:

accessing a server which manages a biometrics authentication application program from a portable communication terminal having a contact-free communication unit and a mobile communication unit, via a mobile communication network;

downloading said biometrics authentication application program from said server to said portable communication terminal;

reading contents of an individual card which stores biometrics information to use for biometrics authentication from said individual card at a terminal device;

detecting the biometrics information of a user, using a biometrics information detection unit of the terminal device after reading;

verifying said biometrics information on said individual card against the biometrics information detected by said biometrics information detection unit, using the terminal device;

communicating between said terminal device and said portable communication terminal to which said biometrics application program has been downloaded through said contact-free communication unit of the portable communication terminal when said verification result is satisfactory; and writing the biometrics information on said individual card to a storage area managed by said biometrics authentication application program in a memory of said portable communication terminal through said contact-free communication unit of the portable communication terminal, and wherein said downloading further comprises: a step that said portable communication terminal accesses a second server by URL (Universal Address Locater) information embedded in said biometrics authentication application program;

a step that said portable communication terminal receives a specification of said storage area managed by said biometrics authentication application program from said second server;

a step of that said portable communication terminal creates said storage area of said biometrics information, in said memory; and a step of displaying that said biometrics authentication application program has completed to create said storage area in said memory, on a screen of the portable communication terminal to notify a completion of a preparation to transplant a biometrics authentication function in the individual card, and wherein said writing further comprises:

a step of second displaying a registration selection menu on the screen of the portable communication terminal by operating the portable communication terminal by the user when said biometric authentication application program authorizes an access of said terminal device by communicating the terminal device with the portable communication terminal to start the biometrics authentication application program; and a step of starting the writing step by designating the registration selection menu by the user.

2. The biometrics authentication method according to claim 1, wherein writing step comprises:

a step of communicating by said terminal device with said portable communication terminal to which the biometrics authentication application program has been downloaded;

a step of judging whether or not said portable communication terminal is permitted to use biometrics authentication by said terminal device; and a step, upon judging that said portable communication terminal is permitted to use biometrics authentication, of writing the biometrics information on said individual card to said storage area managed by said biometrics authentication application program of said portable communication terminal.

3. The biometrics authentication method according to claim 1, wherein said writing step comprises a step of writing said biometrics information and individual information for said user to enable use of biometrics authentication to said portable communication terminal.

4. The biometrics authentication method according to claim 3, wherein said writing step comprises a step of writing said biometrics information and account information for said user to enable use of biometrics authentication to said portable communication terminal.

5. A biometrics authentication system, comprising:

a server, which is accessed via a mobile communication network by a portable communication terminal having a contact-free communication unit and a mobile communication unit, and which transmits a biometrics authentication application to said portable communication terminal;

a registration terminal comprises:

a card reader/writer which reads contents of an individual card in which biometric information for a user is stored and which is used for biometric authentication by said user;

a contact-free communication unit which executes communication with the contact-free communication unit of the portable communication terminal to which the biometrics authentication application program has been downloaded; and a control unit which writes the biometrics information on said individual card to a storage area managed by said biometrics authentication application program in a memory of said portable communication terminal when said biometric authentication application program authorizes an access of said registration terminal by said contact-free communication so that the portable communication terminal has a function of said biometric authentication of said individual card, wherein said control unit detects the biometrics information of said user, using a biometrics information detection unit, verifies said biometrics information on said individual card against the biometrics information detected by said biometrics information detection unit, and writes, when said verification result is satisfactory, said biometrics information on said individual card to said storage area in said memory of said portable communication terminal through said contact-free communication unit of the portable communication terminal, and wherein said portable communication terminal accesses a second server by URL (Universal Address Locator) embedded in said biometrics authentication application program, receives a specification of said storage area managed by said biometrics authentication application program from said server, and creates said area for storage of said biometrics information, in said memory, and displays that said biometrics authentication application program has completed to create said storage area in said memory, on a screen of the portable communication terminal to notify a completion to transplant a biometrics authentication function in the individual card, and wherein the portable communication terminal displays a registration selection menu on the screen of the portable communication terminal by operating the portable communication terminal by the user after authorizing said access to start the biometrics authentication application program, and the control unit starts writing process of the biometrics information by designating the registration selection menu by the user.

6. The biometrics authentication system according to claim 5, wherein said registration terminal communicates with said portable communication terminal to which the biometrics authentication application program has been transmitted, judges whether said portable communication terminal is permitted to use of the biometrics authentication, and when it is judged that said portable communication terminal is permitted to use biometrics authentication, writes the biometrics information on said individual card to said storage area managed by said biometrics authentication application program of said portable communication terminal.

7. The biometrics authentication system according to claim 5, wherein said registration terminal writes said biometrics information and individual information for said user to enable use of biometrics authentication to said portable communication terminal.

8. The biometrics authentication system according to claim 5, wherein said registration terminal writes said biometrics information and account information for said user to enable use of biometrics authentication to said portable communication terminal.

9. A biometrics authentication system, comprising:
a portable communication terminal, having a contact-free communication unit and a mobile communication unit, which accesses a server managing a biometrics authentication application program via a mobile communication network, and receives said biometrics authentication application program from said server;
a biometrics information registration device comprises:
a card reader/writer which reads contents of an individual card in which biometric information for a user is stored and which is used for biometric authentication by said user;
a contact-free communication unit which executes communication with the contact-free communication unit of the portable communication terminal to which the biometrics authentication application program has been downloaded; and
a control unit which writes the biometrics information on said individual card to a storage area managed by said biometrics authentication application program in a memory of said portable communication terminal when said biometric authentication application program authorizes an access of said biometrics information registration device by said contact-free communication so that the portable communication terminal has a function of said biometric authentication of said individual card,
wherein said control unit detects the biometrics information of said user, using a biometrics information detection unit, verifies said biometrics information on said individual card against the biometrics information detected by said biometrics information detection unit, and writes, when said verification result is satisfactory, said biometrics information on said individual card to said storage area in said memory of said portable communication terminal through said contact-free communication unit of the portable communication terminal,
and wherein said portable communication terminal accesses a second server by URL (Universal Address Locator) information embedded in said biometrics authentication application program, receives a specification of said storage area managed by said biometrics authentication application program from said server, and creates said area for storage of said biometrics information, in said memory, and displays that said biometrics authentication application program has completed to create said storage area in said memory, on a screen of the portable communication terminal to notify a completion of a preparation to transplant a biometrics authentication function in the individual card, and
wherein said portable communication terminal displays a registration selection menu on the screen of the portable communication terminal by operating the portable communication terminal by the user after authorizing said access to start the biometrics authentication application program and
the control unit starts writing process of the biometrics information by designating the registration selection menu by the user.

10. The biometrics authentication system according to claim 9, wherein said biometrics information registration device communicates with said portable communication terminal to which the biometrics authentication application program has been transmitted, judges whether said portable communication terminal is permitted to use of the biometrics authentication, and when it is judged that said portable communication terminal is permitted to use biometrics authentication, writes the biometrics information on said individual card to said storage area managed by said biometrics authentication application program of said portable communication terminal.

11. A biometrics authentication method, comprising the steps of:
accessing a server which manages a biometrics authentication application program that permits to access biometrics information from a portable communication terminal having a contact-free communication unit and a mobile communication unit, via a mobile communication network;
downloading said biometrics authentication application program from said server to said portable communication terminal;
creating a storage area of said biometrics information that is managed by the biometrics authentication application program in a memory of the portable communication terminal;
displaying that said biometrics authentication application program has completed to create said storage area in said memory, on a screen of the portable communication terminal to notify a completion of a preparation to transplant a biometrics authentication function in an individual card;
reading contents of an individual card which stores biometrics information to use for biometrics authentication from said individual card at a terminal device;
detecting the biometrics information of a user, using a biometrics information detection unit after reading;
verifying said biometrics information on said individual card against the biometrics information detected by said biometrics information detection unit;
communicating between said terminal device and said portable communication terminal to which said biometrics application program has been downloaded through said contact-free communication unit of the portable communication terminal;
judging that said biometric authentication application program authorizes an access of said terminal device by communicating the terminal device with the portable communication terminal when said verification result is satisfactory;
second displaying a registration selection menu on the screen of the portable communication terminal by operating the portable communication terminal by the user to start the biometrics authentication application program when authorizing said access; and
writing the biometrics information on said individual card to the storage area managed by said biometrics authentication application program through said contact-free communication unit of the portable communication terminal according to designation of the registration selection menu by the user.

12. A biometrics authentication system, comprising:
a portable communication terminal, having a contact-free communication unit and a mobile communication unit, and that accesses a server which manages a biometrics authentication application program that permits to access biometrics information via a mobile communication network, and receives said biometrics authentication application program from said server;
a biometrics information registration device comprises:
a biometrics information detection unit that detects the biometrics information of a user;

a card reader/writer which reads contents of an individual card in which biometric information for the user is stored and which is used for biometric authentication by said user;

a contact-free communication unit which executes communication with the contact-free communication unit of the portable communication terminal to which the biometrics authentication application program has been downloaded; and a control unit which verifies said biometrics information on said individual card against the biometrics information detected by said biometrics information detection unit, writes the biometrics information on said individual card to a storage area managed by said biometrics authentication application program in a memory of said portable communication terminal through said contact-free communication unit of the portable communication terminal when said verification result is satisfactory, wherein the biometrics authentication application program creates the storage area of said biometrics information in the memory of the portable communication terminal, and displays that said biometrics authentication application program has completed to create said storage area in said memory, on a screen of the portable communication terminal to notify a completion of a preparation to transplant a biometrics authentication function in the individual card; and wherein the biometrics authentication program displays a registration selection menu on the screen of the portable communication terminal by operating the portable communication terminal by the user when said biometric authentication application program authorizes an access of said biometrics information registration device to start the biometrics authentication application program and the control unit starts writing process of the biometrics information by designating the registration selection menu by the user.

13. A biometrics authentication method, comprising the steps of:

accessing a server which stores a biometrics authentication application program that permits to access biometrics information from a portable communication terminal having a contact-free communication unit and a mobile communication unit, via a mobile communication network;

downloading said biometrics authentication application program from said server to said portable communication terminal;

creating a storage area of said biometrics information that is managed by the biometrics authentication application program in a memory of the portable communication terminal;

displaying that said biometrics authentication application program has completed to create said storage area in said memory, on a screen of the portable communication terminal;

reading contents of an individual card which stores biometrics information to use for biometrics authentication from said individual card at a terminal device according to designation of registration of the portable communication terminal on a display of the terminal device;

detecting the biometrics information of a user, using a biometrics information detection unit after reading;

verifying said biometrics information on said individual card against the biometrics information detected by said biometrics information detection unit;

guiding that the user holds the portable communication terminal over a sensor of the terminal device when said verification result is satisfactory;

communicating between said terminal device and said portable communication terminal to which said biometrics application program has been downloaded through said contact-free communication unit of the portable communication terminal and said sensor;

judging that said biometric authentication application program authorizes an access of said terminal device by communicating the terminal device with the portable communication terminal;

writing the biometrics information on said individual card to the storage area managed by said biometrics authentication application program through said contact-free communication unit of the portable communication terminal when judging that said biometric authentication application program authorizes an access of said terminal device.

14. A biometrics authentication system, comprising:

a portable communication terminal, having a contact-free communication unit and a mobile communication unit, and that accesses a server which stores a biometrics authentication application program that permits to access biometrics information via a mobile communication network, and receives said biometrics authentication application program from said server;

a biometrics information registration device comprises:
a biometrics information detection unit that detects the biometrics information of a user;

a card reader/writer which reads contents of an individual card in which biometric information for the user is stored and which is used for biometric authentication by said user;

a display which guides an operation of the user;

a contact-free communication unit which executes communication with the contact-free communication unit of the portable communication terminal to which the biometrics authentication application program has been downloaded; and a control unit which verifies said biometrics information on said individual card against the biometrics information detected by said biometrics information detection unit according to designation of registration of the portable communication terminal on the display of the biometrics information registration device, guides that the user holds the portable communication terminal over the contact-free communication unit of the biometrics information registration device on said display when said verification result is satisfactory, communicates with the portable communication terminal, writes the biometrics information on said individual card to a storage area managed by said biometrics authentication application program in a memory of said portable communication terminal through said contact-free communication unit of the portable communication terminal when judging that said biometric authentication application program authorizes an access of said biometrics information registration device by the communication, wherein the biometrics authentication application program creates the storage area of said biometrics information in the memory of the portable communication terminal after said download, and displays that said biometrics authentication application program has completed to create said storage area in said memory, on a screen of the portable communication terminal to notify a completion of a preparation to transplant a biometrics authentication function in the individual card.

* * * * *